Dec. 4, 1962     B. M. BEINS ETAL     3,066,854
FLUID-DYNAMIC SYSTEM USING SOLIDS-BEARING GAS
Filed June 1, 1959     2 Sheets-Sheet 1
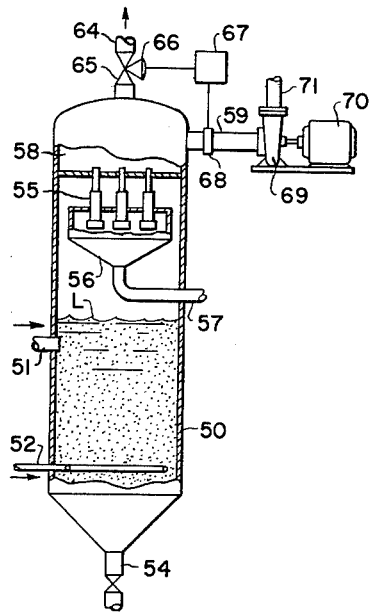
FIG. 4
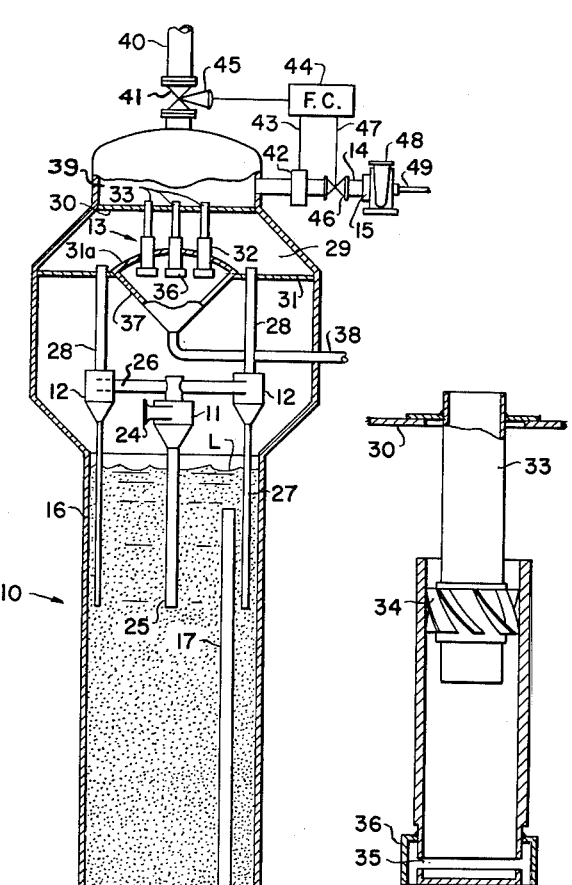
FIG. 1
FIG. 2
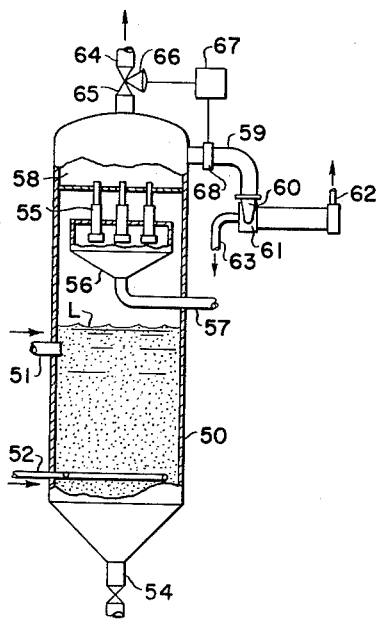
FIG. 3
INVENTORS:
BEREND M. BEINS
JUSTIN C. DYGERT
BY: *Oswald H. Milmore*
THEIR ATTORNEY Dec. 4, 1962   B. M. BEINS ETAL   3,066,854
FLUID-DYNAMIC SYSTEM USING SOLIDS-BEARING GAS
Filed June 1, 1959                                    2 Sheets-Sheet 2

INVENTORS:
BEREND M. BEINS
JUSTIN C. DYGERT
BY: *Oswald H. Milmore*
THEIR ATTORNEY

United States Patent Office 3,066,854
Patented Dec. 4, 1962

3,066,854
FLUID-DYNAMIC SYSTEM USING
SOLIDS-BEARING GAS
Berend M. Beins, San Anselmo, and Justin C. Dygert,
Walnut Creek, Calif., assignors to Shell Oil Company, a
corporation of Delaware
Filed June 1, 1959, Ser. No. 817,941
10 Claims. (Cl. 230—202)

This is a continuation-in-part of our application Serial No. 746,962 filed July 7, 1958, now abandoned.

The invention relates to a fluid-dynamic system including (1) an inertial type separator of the stationary or rotary form wherein erosive solids are separated from an entraining gas and (2) a fluid-dynamic device containing gas-deflecting walls, such as moving or stationary blades which affect the gas flow, e.g., an expansion gas turbine, a compressor, or an expansion vortex tube, to which the clean gas from the separator is admitted. More particularly, the invention is concerned with an improved method of operating such a system whereby the degree of separation in the separator is controlled in a manner to achieve reduced erosion damage in both of the specified major components of the system; and with an improved system in which the said components are matched to achieve reduced erosion damage in both.

Fluid-dynamic systems of the type indicated above are encountered, for example, in catalytic cracking plants which use finely-divided solid catalysts, such as metal oxide powder consisting of or containing particles with diameters between 1 and 75 microns, in the fluidized state within a reactor or regenerator through which a hydrocarbon gas or a combustion-fluidizing gas, respectively, is passed under superatmospheric pressure, when it is desired to recover shaft work from the discharged gas. Because the exit gas contains entrained solid particles which are erosive to the moving blades of the turbine it is necessary to remove erosive particles before admitting it to the turbine; inertial type separators are used for this purpose to avoid cooling the gas and because they are simple and economical. The invention is, however, applicable also to other operations, such as power plants wherein finely comminuted or powdered coal is burned under superatmospheric pressure and the combustion products are freed from entrained erosive solid particles of the stated sizes in an inertial type separator before being passed through an expansion gas turbine, as well as to systems wherein gas is compressed by a compressor after separation of such small, entrained solids therefrom. The fluid-dynamic device may also be a vortex tube, wherein the gas is expanded with rotational motion to separate it into relatively warmer and colder fractions, e.g., for generating cold; here the confining walls of the vortex chamber constitute the gas-deflecting walls. Here, too, inertial type separators are preferred because of simplicity and economy.

A fluid-dynamic device, as well as an inertial-type separator, as these terms are used herein, is a device in which there occurs a change in the momentum of a gas current by reaction with a wall: either the change in momentum of the stream induces a force on the wall or the wall induces extensive change in momentum in the stream. This applies both to moving, specifically rotating, and to stationary walls.

The damage to the gas-deflecting walls or blades of fluid-dynamic devices caused by gas-entrained erosive solids has heretofore restricted the practical application of systems working on gas which initially contains fine erosive solids, particularly when significant amounts of solids having diameters between 1 and 75 microns are present, because of the difficulty and cost of effecting substantially complete removal of the solids. It is known that such fine solid particles erode not only the fluid-dynamic device but also the inertial type separator; the erosion rate in the latter increases significantly as the degree of separation is increased. Thus, to remove progressively greater proportions of the smaller-diameter particles it is necessary to operate the separator at higher gas flow rates and greater inertial effects, which greatly increases the erosion damage in the separator and necessitates frequent maintenance and repair. As a consequence the service life of the fluid-dynamic device can be prolonged only by reducing the service life of the separator, and vice versa. Obviously, the system component having the shorter service life limits the maintenance-free service life of the entire plant.

The service life of the two major components of the system, i.e., of the inertial type separator and the fluid-dynamic device, has been expressed in terms of damage moduli, as defined in the sequel. Stated generally, the damage modulus is a measure of the amount of entrained particulate matter per unit frontal area of the separator walls or the walls of the fluid-dynamic device, the kinetic energy of the particles at the point of impact, the fraction of the particles which actually hit the walls, the angle of impact of the particles upon the surface, and the physical properties of the particles and the surface. As the damage modulus increases the rate at which the walls lose weight by erosion (herein called "element weight loss per hour") increases, leading to reduced service life for the equipment under consideration.

It is generally accepted by persons familiar with the subject of erosion that the element weight loss rate is approximately proportional to the damage modulus and reaches zero only when the damage modulus falls to zero, i.e. when the gas is entirely free from particulate matter. This belief in a substantially linear relation between element weight loss rate and damage modulus has led to the conclusion that the walls of the fluid-dynamic device can be effectively protected only by achieving a very high, substantially complete removal of solids from the gas. However, as the separator is operated to achieve progressively higher solids separation the damage modulus therein rises sharply, causing increased elemental wear rates which are likewise held to be proportional to the damage modulus. From a study of the expected service lives of the separator and the fluid-dynamic device it appears that when the system is operated so that the service lives are equal, they are too short—typically under 10,000 hours to make the system economically attractive. Additionally, it should be noted that making the service lives equal is not economically feasible unless these lives are materially in excess of 10,000 to 20,000 hours because of the high cost of interruptions in the operation of associated plant units and also the labor required to repair turbines and compressors.

Further, it is not practicable to operate such a system under the precise condition at which the two service lives are equal, due to the need to provide some flexibility for handling gas at varying flow rates and/or with different amounts or grades of entrained particles. This consideration has made it imperative to have available an operating range rather than an operating point. It is evident that when working at different points within such a range one or the other of the service lives is reduced, leading to an expected reduction in the maintenance-free service life of the plant to far below 10,000 hours.

The foregoing circumstances have heretofore prevented the extensive use of systems such as are considered herein.

It is an object of this invention to improve the operation of such fluid-dynamic systems whereby erosion damage is reduced both in the inertial type separator and in the fluid-dynamic device and to provide an operating range within which the system can be operated with prolonged service life.

The invention is based upon the discoveries that the abovementioned expected, substantially linear relationship between the damage modulus and element weight loss per hour does not hold throughout the entire range of damage moduli down to zero but that, on the contrary, as the damage modulus is decreased the element weight loss per hour falls sharply and attains an acceptably or negligibly small value when the damage modulus is reduced to below a finite positive value; and that the relationship of the damage moduli for the inertial type separator and for the fluid-dynamic device and their corresponding erosion rates are such that there exists a heretofore unrecognized useful operating range (determined by the separating level of the separator) such that both elemental weight loss rates are so low that both major units of the system operate with acceptably long service lives, viz., in excess of 10,000 to 20,000 hours.

Stated in another way, the damage modulus for the separator decreases as the separating level therein is lowered, to remove less of the extremely fine solids, while the damage modulus for the fluid-dynamic device correspondingly increases. However, as the separating level is varied (by control of the operating conditions in the separator and/or by choice of a separator of selected characteristics in relation to the composition and rate of the initial, particle-laden gas), there exists an operating range throughout which both damage moduli lead to acceptably low elemental weight loss rates.

Based upon the foregoing discoveries, the instant invention resides in operating the inertial type separator at a selected separating level and at a flow rate through the fluid-dynamic device such that the fractional elemental weight loss per hour due to erosion (as defined hereinafter) is less than $1 \times 10^{-5}$ both in the separator and in the fluid dynamic device. With the usual constructions for these devices, this operation results in using a damage modulus below 22 for the separator and below 11.8 for a bladed fluid-dynamic device such as a turbine or compressor or below a value between 11.8 and 22 for other fluid-dynamic devices using thicker walls. The damage moduli stated are to be computed in accordance with the formulae given herein. The invention resides further in the combination of an inertial type separator and fluid-dynamic machine having the matched relation that, when operated on a source gas of a given composition which includes erosive solids entrained therein, both sustain fractional elemental weight losses below $1 \times 10^{-5}$, i.e., both have damage moduli below 22 (the damage in the latter machine being less than 11.8 for bladed equipment).

The invention will be further described with reference to the accompanying drawings forming a part of this specification and illustrating one specific embodiment by way of example, wherein:

FIGURE 1 is a schematic diagram of a fluid-dynamic system according to the invention which comprises a gas expansion turbine;

FIGURE 2 is an enlarged elevation of one separator, parts being broken away;

FIGURE 3 is a schematic diagram of a fluid-dynamic system which comprises a vortex tube;

FIGURE 4 is a schematic diagram of another fluid-dynamic system which comprises a compressor;

Figure 5:
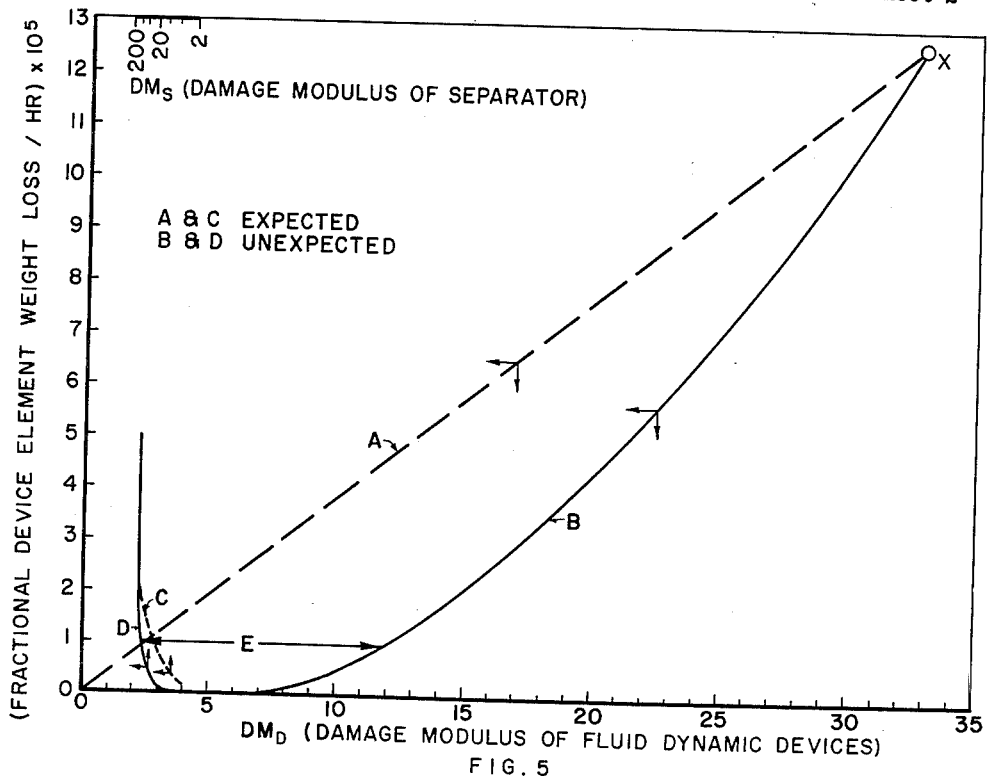
FIGURE 5 is a graph showing the expected and discovered relationships between the weight loss rates and the damage moduli and illustrating the useful operating range.

Referring to FIGURES 1 and 2, the system includes a source 10 of a gas which carries entrained solid particles, an inertial type separator, which may comprise a plurality such as three stages of cyclones 11—13, a clean-gas discharge duct 14, and a fluid-dynamic device 15 in the form of an expansion gas turbine.

The source 10 may, for example, be a fluidization vessel forming the regenerator of a catalytic cracking plant. In such case it may include a vertically elongated vessel 16 provided with a riser pipe 17 through which catalyst particles, such as silica-alumina particles of different sizes passing a U.S. Standard 100-mesh screen which bear carbonaceous deposits as a result of use in the cracking of hydrocarbons, are admitted from the supply standpipe 18. The catalyst is engaged by a lift gas, such as compressed air admitted at 19. Fluidization-combustion air under superatmospheric pressure is admitted to a lower part of the vessel from a supply pipe 20 through a bed-air distributor 21 to fluidize the catalyst up to a level L, and regenerated catalyst is withdrawn continuously through an outlet 22. The temperature within the fluidized bed is typically between 700 and 1200° F., at which temperature the carbonaceous deposits on the catalyst are burned. The rate of gas admission may be controlled by any suitable means, such as a valve 23 in the supply pipe 20.

The combustion products discharged from the top of the fluidized bed at superatmospheric pressure, such as 15 to 35 lbs. per sq. in. gage, entrain some of the catalyst particles which are partly separated in the cyclones 11—13. It will be understood that any desired number of stages of cyclones, such as the three shown, may be used and that each stage may include any number of cyclones, e.g., one to six for each of the first two stages and ten to sixty for the third stage. Each first-stage cyclone 11 has an intake 24 positioned to receive gas above the top of the fluidized bed, a solids outlet pipe 25 which extends down into the fluidized bed in the form of a dipleg, and a gas outlet duct 26 which is connected to the intake of a second-stage cyclone 12. Each second-stage cyclone also has a solids outlet pipe 27 extending into the fluidized bed and a gas outlet pipe 28 which discharges gas into a distributing chamber 29 defined between the vessel top closure 30 and a partition wall 31. The central part 31a of the partition is upwardly convex for structural reasons and supports a large number of small, third-stage cyclones 13 having outer tubes 32 which extend through the partition. In the embodiment shown in FIGURE 2 each third-stage cyclone includes, further, a smaller, concentric gas outlet tube 33 which is fitted to a hole in the closure wall 30 and swirl vanes 34 in the annular space between the tubes. Solids, together with some blow-down gas, are discharged at or near the bottoms of the tubes through slits 35 which may be surrounded by annular, cylindrical skirts 36, into a common collecting chamber defined by a hopper 37; the separated solids and blow-down gas are discharged through a solids discharge duct 38 which extends out through the wall of the vessel 16.

The clean gas flows from the tubes 33 into a plenum chamber 39 to which the duct 14 is connected. To maintain a safe operating pressure and to regulate the quantity of clean gas admitted to the turbine, the chamber 39 is provided with a vent stack 40 controlled by a throttle valve 41, which may be operated manually or by any suitable means. For example, the duct 14 may have a flow-measuring device 42 connected by a line 43 to a flow controller 44 the set point of which can be adjusted and which has its output connected to a valve operator 45 for venting a variable amount of gas from the chamber 39 to the stack. The duct 14 may be further provided with an emergency shut-off valve 46 which is connected by an indicating line 47 to the flow controller to cause the vent valve 41 to be opened when the valve 46 is shut.

The turbine 15, which may be of any type, is represented as an axial flow, axial inlet turbine having an exit scroll 48 and a shaft 49 by which shaft work is delivered to a suitable machine, such as a compressor or generator, not shown.

The damage moduli for the inertial type separator, $DM_s$, and for the fluid dynamic device, $DM_d$, are defined as follows:

$$DM_s = \left[\frac{\dot{M}}{A_s}\sum_{i}^{\infty}(u^2\alpha\eta_s\Delta V)_i\right]\varphi \times 10^{-6}$$

$$DM_d = \left[\frac{\dot{M}}{A_d}\sum_{i}^{\infty}\{u^2\alpha\eta_d(1-\eta_z)\Delta V\}i\right]f\varphi \times 10^{-6}$$

wherein:

$DM_s$ and $DM_d$ are the damage moduli, having the dimension $$\left(\frac{\text{grams}}{\text{min.}}\right)\left(\frac{1}{\text{ft.}^2}\right)\left(\frac{\text{ft.}}{\text{sec.}}\right)^2$$

$\dot{M}$ is the mass rate of solid particles, in grams per min., flowing into the separator, being equal to $60u_0\rho c$.

$u_0$ is the velocity of approach of the gas into the separator.

$\rho$ is the gas density, in lbs. per cubic ft.

$c$ is the concentration of the particles in grams of particles per lb. of gas.

$A_s$ and $A_d$ are the projected areas of the walls of the separator and of the fluid dynamic device, respectively, i.e., the areas of the surfaces eroded by the particles projected on planes normal to the gas flow directions in sq. ft.

$u$ is the particle impact velocity for the $i^{\text{th}}$ size grade in ft. per sec.

$\alpha$ is the particle impact angle coefficient for the $i^{\text{th}}$ size grade.

$\eta_s$ and $\eta_d$ are the particle interception efficiencies of the eroded wall of the separator and fluid-dynamic device, respectively, for the $i^{\text{th}}$ grade. It is the fraction of the particles of the particular size grade carried by the gas which hit the wall.

$\eta_g$ is the separator grade efficiency for the $i^{\text{th}}$ size grade.

$\Delta V$ is the fraction of particles in the $i^{\text{th}}$ size grade upstream from the separator.

$f$ is the fraction of the clean gas admitted to the fluid-dynamic device.

$\phi$ is the erosion factor, determined by the properties of the particles and the surface physical properties of the eroded wall; it has a value of 1 for unhardened rolled steel and particles of the character of silica-alumina cracking catalyst; for other systems the factor has a value which is proportional to the damage.

Subscripts in the foregoing symbols are used as follows:

$s$ denotes the inertial type separator.

$d$ denotes the fluid-dynamic device, such as a turbine, compressor or vortex tube.

$w$ denotes the wall eroded by the particles, e.g., the blades of a turbine or compressor or the wall of a cyclone or vortex tube.

$g$ identifies the efficiency as being grade efficiency, for a particular size grade, that is, the average separation efficiency for a particular band of particles in the overall spectrum of particle diameters.

$i$ designates the particular size grade, i.e., the particular band of particle diameters in the overall spectrum.

It is noted from the equations that each of the moduli is computed by a process of summation of products for bands of particle diameters. In any computation the widths of these size grade bands are made sufficiently small to yield a summation of the desired accuracy, considering the magnitude and changes in the magnitudes of the summed terms. For example, narrow bands, covering variations in particle diameters of about 1 to 3 microns, may be used in some parts of the spectrum and wider bands, such as 10 to 25 microns in width, may be used at other parts of the spectrum. It is evident that the particle size distribution must be considered in selecting the band widths.

As was stated previously, one would expect the element weight loss rate to decrease according to some substantially linear curve with decreasing damage moduli. This expected relationship is shown for a particular expansion gas turbine by the dashed curve A in FIGURES 5 and 6, wherein the ordinates give the erosion rates and the abscissae at the bottom the damage moduli $DM_d$; the point X represents an actual measurement on an axial flow turbine which was operated on gas containing silica-alumina cracking catalyst including particles 1–75 microns in width, wherein the damage modulus was 32.8 and the fractional element weight loss per hour was $12.7 \times 10^{-5}$.

"Fractional device element weight loss per hour" denotes the weight of metal which is lost by erosion in one hour from a given element of the device divided by the weight of that element. The element considered is, of course, not the weight of the entire structural part but of the portion which is exposed to the gas and subject to damaging erosion, sometimes called the "wetted part." For example, in the case of a cyclone as is shown in FIGURE 2 it is the blades 34, excluding the base ring by which they are mounted to the tube 33; in the case of a bladed device such as a turbine or compressor, it is the portion of one stator or rotor blade which is impinged by the gas. In the case of a cyclone having a tangential inlet it is the region of the cyclone wall opposite the inlet on which the entering solids impinge. It is evident that, for two elements subjected to the same absolute rate of weight loss, the element having a greater wall thickness has a lower fractional element weight loss rate.

The service life of a piece of equipment is related directly to the fractional element weight loss as follows: Experience has shown that equipment of the type herein considered remains serviceable until about one-tenth of the metal in the worn element has been lost by erosion; this fraction is not rigid but is representative of common practice. The expected service life in hours is, therefore, one-tenth of the reciprocal of the fractional elemental weight loss per hour indicated in FIGURES 5 and 6.

Each damage modulus corresponds to a particular rate of erosion. On the basis of the experimentally determined point X in FIGURE 5 one would expect erosion rates to be governed by the relationship indicated by the curve A, and this curve has been used to predict service life. However, in accordance with this invention it was found that the curve A does not correctly define the relationship but that, instead, the erosion in the turbine varies with decreasing damage moduli in accordance with the curve B, which is also to be read with the scales at the left and bottom. It is to be noted that the erosion rate falls off more sharply with decreasing damage moduli than would be expected from the curve A, and that it reaches the acceptably low fractional device element loss of $1.0 \times 10^{-5}$ per hour when the damage modulus falls to about 11.8. This represents an expected service life of about $1.0 \times 10^{-4}$ hours, which is in excess of one year. The curve further shows that by reducing the damage modulus to 10 the erosion loss rate is cut in half and becomes imperceptible when the damage modulus falls to 6.0.

A corresponding relationship was found for the separator. Here the expected relationship is shown by the dashed curve C, which is to be read with the abscissae scale at the top, which is for convenience drawn inverted and shows the $DM_s$. Lower damage moduli result from operating the separator under less severe conditions, at which less solids are separated and the cut-off point is raised, i.e., only larger particles are removed. It was found that, for a particular system including a cyclone and an expansion gas turbine, operating on combustion gas from a catalytic cracking plant regenerator, the two abscissae scales for $DM_d$ and $DM_s$ have approximately the relation shown in FIGURES 5 and 6. Because inertial type separators are in practice constructed with thicker walls than are turbine blades, the same absolute erosion rates produce lower fractional erosion rates in such separators. These scales were drawn for the typical case in which the separator element walls are five tmes as thick as the turbine blades, so that a given damage modulus produces one-fifth the fractional element loss rate. For example, as may be scaled from FIGURE 6, a damage modulus of 10 was expected to produce a fractional element loss rate of about $3.9 \times 10^{-5}$ in a turbine (curve A) but only $0.8 \times 10^{-5}$ in the separator (curve C).

It was found, in accordance with this invention, that the curve C also does not accurately describe the actual erosion loss rates, but that these rates are more accurately represented by the curve D. It is, therefore, possible to predict service life and select operating conditions by considering the curves B and D. Curve D shows the fractional element device weight loss to be $1 \times 10^{-5}$ with a damage modulus of 22, $0.5 \times 10^{-5}$ with a damage modulus of 18, and imperceptible when the damage modulus is below 5.0.

It will be noted that there is a useful operating range, indicated by the horizontal bar E, at which the fractional element weight loss rates for the separator and fluid-dynamic device are both below $1.0 \times 10^{-5}$, corresponding to damage moduli of less than 11.8 and 22, respectively. By operating at any point within this range neither loss rate will exceed the stated value and the service life will never be less than 10,000 hours. By operating within the preferred, central region of this range, shown by the bar F, i.e., holding the damage moduli below 10 and 18, respectively, the minimum service life can be increased to svaral years. Imperceptible erosion occurs when the damage moduli are held below 6.0 and 5.0, respectively.

Figure 6:
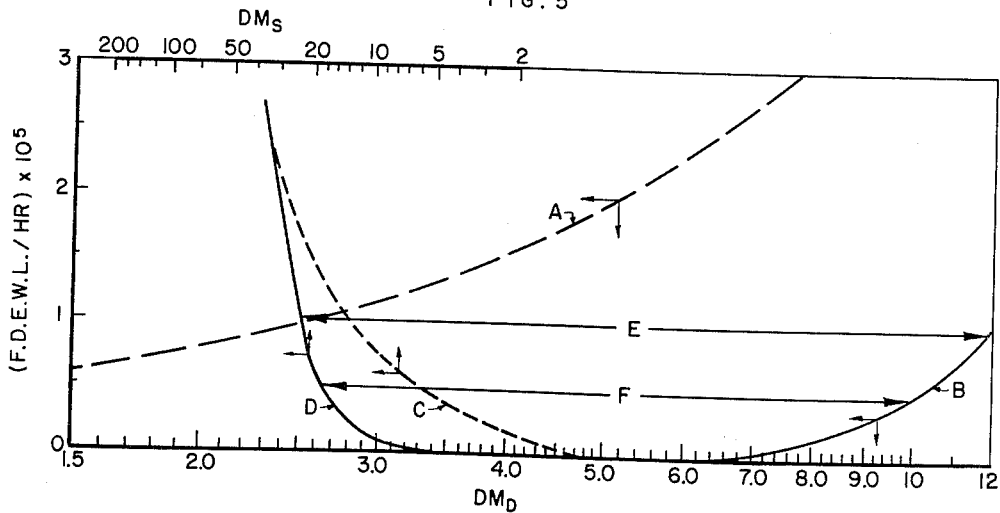
FIGURE 6 is an enlarged view of a portion of FIGURE 5, the abscissae being plotted logarithmically.

It is evident from FIGURES 5 and 6 that the existence of the useful and preferred operating ranges were not predictable from the previously expected loss rates as given by the curves A and C.

Similar operating ranges occur for systems wherein the devices have other element wall thicknesses and wherein the relationship between damage moduli and fractional element loss rates may differ. In most instances, however, the relations will lie between the extremes shown by the curves B and D. For example, when the wall thickness in the fluid-dynamic device is double that for which the curve B was computed, a damage modulus of 10.0 produces a fractional loss rate of $0.25 \times 10^{-5}$ per hour.

It will be appreciated that operating points to the left of the bar E represent operations at which a very high proportion of the solids is separated, while points to the right of this bar represent operations with less effective separations, at which the cut-off particle size becomes progressively larger. The specific relationship between these cut-off sizes and the damage moduli depends upon the characteristics of the system and the particles and their size distribution. However, the following approximate relationships are valid for systems operating on gas streams carrying solids of the characteristic and size distribution encountered in catalytic cracking, the latter consisting predominantly of particles having diameters less than 150 microns and including both particles with diameters greater than 20 microns and less than 10 microns, when said systems have curved gas-flow channels with a mean radius of curvature between ¼ and 50 inches, a frictionless flow fluid velocity ratio between entrance and discharge velocities between 1 and 100, (wherein either the entrance or the discharge velocity may be the greater) and a maximum Mach number of 0.2 to 1.5. With such a system the aforesaid operating range is attained when at least 95% of the particles with diameters greater than 20 microns are separated and at least 22% of the particles with diameters smaller than 10 microns are retained in the gas. Typically, such a gas entering the third stage separator 13 contains 0.20 to 1.0 grams of catalyst per lb. of regenerator exit gas, and of the entrained catalyst the percentages by weight of fractions (a) smaller than 10 microns, (b) between 10 and 20 microns and (c) above 20 microns are: (a) 5 to 20%, (b) 10 to 25% and (c) 55 to 85%.

Referring again to FIGURES 1 and 2, the cyclones 11—13 have dimensions such that, for the rate at which lift and fluidization gases are admitted at 19 and 20, the cyclones operate with damage moduli below 22 and, preferably, below 18. It is evident from the above formulae that when the rate of gas admission is increased there is a corresponding rise in the approach velocity $u_0$; this may be accompanied by a rise in the degree of entrainment and, hence $c$, so that $\dot{m}$ is increased; further $u$, the particle impact velocity increases. The factors increase sufficiently to cause the modulus $DM_s$ to increase. According to the invention the gas flow rate should be kept low enough to avoid a rise of the modulus beyond the stated levels. As is understood in the art, such increased gas flow causes an increased separating efficiency, up to some plateau which is a characteristic of the separator.

The turbine 15 is designed to operate with a damage modulus less than 11.8 and, preferably, less than 10, for the expected gas flow rate and composition as regards the entrained solids. An independent change of the damage modulus is possible by adjusting the set point of the flow controller 44. This changes the factor $f$ in the formula for $DM_d$. For example, with increased gas flow rates through the cyclones and increased separating efficiencies the clean gas entering the plenum chamber 39 may contain a lower concentration of solids; yet in view of the gerater volumetric flow it could result in operation of the turbine at an increased damage modulus. However, if the flow to the turbine is restricted by venting a suitable amount of the gas through the stack 40 the damage modulus in the turbine can be controlled to maintain it below the specified level.

FIGURE 3 illustrates the application of the invention to a system which includes a vortex tube. The system includes a source 50 for gas burdened with solid particles, e.g., a vessel to which finely-divided solids, such as heat-transfer material of the same composition of catalyst or consisting of sand, is admitted at 51 and fluidized by fluidization gas admitted at 52 to fluidize the solids to the level L. The solids are discharged at 54 and gas emerging from the bed and carrying entrained solids enter the tubular cyclone separators 55. Separated solids (optionally together with blow-down gas) are discharged into the hopper 56 and discharged through a pipe 57 and clean gas enters a plenum chamber 58. The latter is connected by a duct 59 to the tangential inlet 60 of a vortex tube 61 wherein the gas is separated into hot and cold fractions by the heat-separation effect. Such tubes, also called Ranque tubes or Hilsch tubes, are known in the art, see U.S. Patent No. 1,952,281 and the bibliography by Curley and MacGee, Jr., published in Refrigerating Engineering, vol. 59, 1951, pp. 66 and 191–193; no further description thereof is, therefore, necessary. The vortex tube separates the gas into an outer, hot fraction, which is discharged at 62 and an inner, cold gas fraction, which is discharged at 63. The system may optionally be provided with a vent stack 64 connected to the plenum chamber via a vent valve 65, a valve operator 66, a flow controller 67 and a flow-measuring device 68 in the duct 59, all as described for FIGURE 1.

The operation and principles previously considered apply to FIGURE 3, in that both the separators 55 and the vortex tube 61 are operated with damage moduli below 22 and, preferably, below 18, as indicated by the curve B. Inasmuch as such a system is in most instances used to generate a cold stream 63 it is of special interest when the gas from the source 50 is cold. This would be the case when the gas admitted at 52 is pre-cooled, e.g., for cooling the solids.

FIGURE 4 shows a system wherein the fluid-dynamic machine is a compressor. Reference numbers 50—52, 54—59 and 64—68 indicate parts like those described for FIGURE 3. The duct 59 is connected to a gas compressor 69, driven by an electric motor 70 and having a compressed gas outlet 71. The system is operated as described above for FIGURE 1 to operate both the separators and the compressor at low-erosion conditions.

We claim as our invention:

1. In the method of operating a fluid-dynamic system wherein a stream of gas which is burdened with erosive solid particles of different sizes, including particles with diameters falling within the range of 1 to 75 microns, is admitted into an inertial type separator, erosive particles are separated from the gas in said separator, and cleaned gas from said separator is admitted to a fluid-dynamic device having a gas-deflecting wall, the gas admitted to the said device containing the solid particles in the same quantity and same size distribution as the gas discharged from said separator, the improvement which comprises operating said separator at a controlled separating level, with only partial separation of said particles from the gas, the damage modulus $DM_s$ for said separator is below 22 and the damage modulus $DM_d$ for said fluid-dynamic device is below 11.8, the said moduli being defined:

$$DM_s = \left[\frac{\dot{M}}{A_s} \sum_i^\infty (u^2 \alpha \eta_s \Delta V) i\right] \varphi \times 10^{-6}$$

$$DM_d = \left[\frac{\dot{M}}{A_d} \sum_i^\infty \{u^2 \alpha \eta_d (1-\eta_g) \Delta V\} i\right] f \varphi \times 10^{-6}$$

wherein $\dot{M}$ is the mass rate of solid particles entering the separator, in grams per min., $A_s$ and $A_d$ are the projected wall areas of the separator and fluid-dynamic device, respectively, normal to the gas flow directions in sq. ft., $u$ is the particle impact velocity of the $i^{th}$ size in ft. per sec., $\alpha$ is the particle impact angle coefficient for the $i^{th}$ size grade, $\eta_s$ and $\eta_d$ are the particle interception efficiencies of the eroded wall of the separator and the fluid-dynamic device, respectively, for the $i^{th}$ size grade, $\eta_g$ is the separator grade efficiency for the $i^{th}$ size grade, $\Delta V$ is the fraction of particles in the $i^{th}$ size grade upstream from the separator, $f$ is the fraction of the clean gas admitted to the fluid-dynamic device, and $\varphi$ is the erosion factor.

2. Method according to claim 1 wherein a fractional part of said cleaned gas only is admitted to the fluid-dynamic device.

3. Method according to claim 1 where $f$ is substantially unity.

4. Method according to claim 1 wherein said fluid-dynamic device is a bladed machine.

5. Method according to claim 4 wherein said fluid-dynamic device is an expansion gas turbine and said cleaned gas is expanded therein with the generation of shaft power.

6. Method according to claim 4 wherein said fluid-dynamic device is a gas compressor having a bladed rotor and said cleaned gas is compressed therein.

7. Method according to claim 1 wherein said separator is a cyclone and the gas is passed therethrough at a superatmospheric temperature and pressure, said solid particles are metal oxide cracking catalyst, and said fluid-dynamic machine is an expansion gas turbine.

8. Method according to claim 1 wherein said fluid-dynamic device is a vortex tube and said cleaned gas is expanded therein with a vertical motion to separate the gas into hot and cold fractions by the heat-separation effect.

9. Method as defined in claim 1 wherein (a) said solid particles are metal oxide cracking catalyst including larger particles with diameters greater than 20 microns and smaller particles with diameters smaller than 10 microns, (b) said separator is a cyclone having curved gas-flow channels with mean radii of curvature between ¼ and 50 inches, frictionless flow fluid velocity ratios between 1 and 100, and a maximum Mach number between 0.2 and 1.5, and (c) said cyclone is operated to separate from the gas at least 95% of the said larger particles and at least 22% of said smaller particles are left in the clean gas.

10. Method as defined in claim 9 wherein the fractional elemental loss rate per hour in said cyclone separator and in said fluid-dynamic device are both below $1 \times 10^{-5}$.

References Cited in the file of this patent

UNITED STATES PATENTS

| 2,446,388 | Ramseyer et al. | Aug. 3, 1948 |
| 2,892,771 | Millikin | June 30, 1959 |

FOREIGN PATENTS

| 1,142,131 | France | Mar. 25, 1957 |

OTHER REFERENCES

Combustion Engineering by Otto de Lorenzi, Combustion Engineering Superheater, Inc., New York, 1947.

The Modern Gas Turbine, by Sawyer, Prentice-Hall, Inc., New York, 1947.

"Coal Firing Nears the Practical Stage," The Oil Engine and Gas Turbine, volume XIX, issue No. 216, June 1951.

Chemical Process Machinery by Emil Riegel, Rheinhold Publishing Corp., New York, 1953.

Applied Mathematics in Chemical Engineering by Mickley et al., McGraw-Hill Book Co., New York, 1957.

UNITED STATES PATENT OFFICE
CERTIFICATE OF CORRECTION

Patent No. 3,066,854                                December 4, 1962

Berend M. Beins et al.

It is hereby certified that error appears in the above numbered patent requiring correction and that the said Letters Patent should read as corrected below.

Column 5, lines 8 and 11, and column 9, lines 27 and 30 (four occurrences), in the formulae, the horizontal line beneath "M" was omitted. The parts of the formula immediately following the equal signs should read as shown below instead of as in the patent:

$$\left[\frac{\dot{M}}{A_s}\right. \quad \text{and} \quad \left[\frac{\dot{M}}{A_d}\right.$$

column 6, line 58, for "1.0x10$^{-4}$" read -- 1.0x10$^{4}$ --.

Signed and sealed this 25th day of June 1963.

(SEAL)
Attest:

ERNEST W. SWIDER                          DAVID L. LADD

Attesting Officer                            Commissioner of Patents